(12) United States Patent
Mayer et al.

(10) Patent No.: US 10,807,313 B2
(45) Date of Patent: Oct. 20, 2020

(54) BONDING OBJECTS TOGETHER (71) Applicant: Woodwelding AG, Stansstad (CH)

(72) Inventors: Jörg Mayer, Niederlenz (CH); Mario Lehmann, Les Pommerats (CH); Joakim Kvist, Nidau (CH); Patricia Poschner, Uettligen (CH); Marcel Aeschlimann, Ligerz (CH)

(73) Assignee: WOODWELDING AG, Stansstad (CH)

( * ) Notice: Subject to any disclaimer, the term of this patent is extended or adjusted under 35 U.S.C. 154(b) by 224 days.

(21) Appl. No.: 15/578,784

(22) PCT Filed: Jul. 5, 2016

(86) PCT No.: PCT/EP2016/065780
§ 371 (c)(1),
(2) Date: Dec. 1, 2017

(87) PCT Pub. No.: WO2017/005721
PCT Pub. Date: Jan. 12, 2017

(65) Prior Publication Data
US 2018/0111325 A1  Apr. 26, 2018

(30) Foreign Application Priority Data
Jul. 6, 2015 (CH) .......................... 982/15

(51) Int. Cl.
B32B 41/00 (2006.01)
B29C 65/08 (2006.01)
(Continued)

(52) U.S. Cl.
CPC ............ B29C 65/08 (2013.01); B29C 65/645 (2013.01); B29C 66/0324 (2013.01);
(Continued)

(58) Field of Classification Search
CPC ..... B29C 65/08; B29C 66/41; B29C 66/0324; B29C 65/645; B29C 66/472;
(Continued)

(56) References Cited

U.S. PATENT DOCUMENTS

| 4,058,421 A | 11/1977 | Summo |
| 6,514,593 B1 | 2/2003 | Jones et al. |
| 8,225,479 B2 | 7/2012 | Clinch et al. |

FOREIGN PATENT DOCUMENTS

| DE | 27 44 553 | 4/1979 |
| DE | 37 24 253 | 2/1989 |

(Continued)

OTHER PUBLICATIONS

Brazilian Office Action dated Feb. 17, 2020, Application No. BR112017023782-2, 4 pages.
(Continued)

Primary Examiner — Michael N Orlando
Assistant Examiner — Joshel Rivera
(74) Attorney, Agent, or Firm — Rankin, Hill & Clark LLP (57) ABSTRACT A profile body of a not liquefiable material is used as a connecting element between a first object and a second object. The profile body may especially be metallic and/or may be bendable. The profile body, in contrast to a conventional wire, however, has a shape defining a first and a second undercut. The method includes embedding the profile body in the second object so that the second undercut is within material of the second object, and embedding the profile body within material of the first object so that the first undercut is within the first object, and wherein at least embedding of the profile body in the first object is caused by mechanical energy impinging on the first object and/or on
(Continued)

the second object while the first object and the second object are pressed against each other.

28 Claims, 3 Drawing Sheets

(51) Int. Cl.
    *B29C 65/00*     (2006.01)
    *B29C 65/64*     (2006.01)
    *B29K 101/12*     (2006.01)
    *B29L 31/30*     (2006.01)

(52) U.S. Cl.
    CPC .... *B29C 66/1122* (2013.01); *B29C 66/30321* (2013.01); *B29C 66/30325* (2013.01); *B29C 66/30341* (2013.01); *B29C 66/41* (2013.01); *B29C 66/45* (2013.01); *B29C 66/472* (2013.01); *B29C 66/73116* (2013.01); *B29C 66/73921* (2013.01); *B29C 66/8322* (2013.01); *B29C 66/92921* (2013.01); *B29C 66/30223* (2013.01); *B29C 66/3452* (2013.01); *B29C 66/71* (2013.01); *B29C 66/721* (2013.01); *B29C 66/836* (2013.01); *B29C 66/8362* (2013.01); *B29C 66/9513* (2013.01); *B29K 2101/12* (2013.01); *B29L 2031/3055* (2013.01)

(58) Field of Classification Search
    CPC ........ B29C 66/30325; B29C 66/30321; B29C 6/92921; B29C 6/8322; B29C 66/73116; B29C 66/73116; B29C 66/45; B29C 6/30341; B29C 66/1122; B29C 66/71; B29C 66/92921; B29C 66/8322; B29C 66/30341
    USPC .......................... 156/64, 350, 351, 378, 379
    See application file for complete search history.

(56) References Cited

FOREIGN PATENT DOCUMENTS

| DE | 3835640 | 4/1990 |
|---|---|---|
| DE | 10 2008 017 822 | 10/2009 |
| DE | 10 2011 086 791 | 5/2013 |
| EP | 0 284 899 | 10/1988 |
| FR | 1519111 | 3/1968 |
| FR | 2167484 | 8/1973 |
| FR | 2 291 843 | 6/1976 |
| JP | 2008-504990 | 2/2008 |
| RU | 2 281 191 | 8/2006 |
| WO | 2008/110835 | 9/2008 |
| WO | 2009/052644 | 4/2009 |
| WO | 2011/042326 | 4/2011 |

OTHER PUBLICATIONS

Annonymous: "Extruded aluminum profiles by extrusion", My Little Blog Fonderie, Feb. 26, 2014, http://souspression.canalblog.com/archives/2011/02/14/19995083,html; 8 pages, English translation included.

BONDING OBJECTS TOGETHER

BACKGROUND OF THE INVENTION

Field of the Invention

The invention is in the fields of mechanical engineering and construction, especially mechanical construction, for example automotive engineering.

Description of Related Art

In the automotive, aviation and other industries, due to new manufacturing techniques and new materials as well as the constant need for increased efficiency, methods of bonding objects together remain a challenge.

SUMMARY OF THE INVENTION

It is an object of the present invention to provide approaches for bonding objects together, especially for bonding a first object to a second object. It is a further object to reinforce a connection between thermoplastic objects or to mechanically reinforce thermoplastic objects or a thermoplastic object.

In accordance with a first aspect of the invention, a method of bonding a first object to a second object is provided, wherein the first and second objects may have abutting surface portions that locally are to lie flattishly against each other, and the second object for example has a complex surface shape. In such situations, in accordance with the prior art, an adhesive bond is used for the fastening. However, adhesive bonds have certain limitations.

The first aspect provides an alternative solution. In accordance with the first aspect, a profile body of a not liquefiable material is used as a connecting element between a first object and a second object. The profile body may especially be metallic and/or may be bendable. The profile body, in contrast to a conventional wire, however, has a shape defining a first and a second undercut. The method includes embedding the profile body in the second object so that the second undercut is within material of the second object, and embedding the profile body within material of the first object so that the first undercut is within the first object, and wherein at least embedding of the profile body in the first object is caused by mechanical energy impinging on the first object and/or on the second object while the first object and the second object are pressed against each other.

For example, the profile body may be a profiled wire or rod (the difference being that a wire is bendable, whereas a rod is essentially stiff and for this usually has a larger cross section), for example of a metal or a polymer that is not liquefiable or that is liquefiable only at a substantially higher temperature than both, the materials of the first and second objects, or it may be a folded metal sheet with a pattern of openings or a metal sheet with a plurality of partially cut-out and folded portions (tongues), etc.

If the profile body is a profiled wire or rod, its aspect ratio (i.e. ratio between the extension in its longitudinal direction compared to the extensions in radial directions with respect to a longitudinal axis) may be at least 5, at least 20, or, at least 100 if it is a wire.

The advantages of profile bodies that are profiled wires is that they cannot only follow any shape in a plane but also in the third dimension. Thereby, the approach according to the invention is suitable for connecting objects with free-form surfaces of almost any shape.

More in general, the profile body may be essentially one-dimensional, i.e. it may extend along the longitudinal direction with both its transversal dimensions being much smaller than the dimension in the longitudinal direction. Alternatively, it may be a two-dimensional object, extending along two in-plane dimensions.

The profile body may be constituted by a plurality of sub-bodies secured to each other. In this, such sub-bodies may in themselves define the first and second undercuts, and/or the first and second undercuts may be defined by the ensemble of the sub-bodies and their arrangement relative to each other.

The profile body has a profile that defines the first and second undercuts, in contrast, for example, to the shape of a conventional wire having a more or less round cross section. In embodiments, the profile body may have the symmetry of an extruded body (translational symmetry), i.e. have a profile remaining constant along the longitudinal direction. Such bodies may, for example, be manufactured by extrusion but also by other methods. In further embodiments, the undercut defining profile of the profile body is constituted by portions of a metal sheet appropriately folded, deformed, or may be constituted by a cast body (such as die cast), etc.

The first and second undercuts interpenetrated by material of the second/first material secure, after re-solidification, the resulting arrangement against pulling the first/second objects apart (in out-of-plane directions relative to the surface portions around the location where the profile body is embedded; this out-of-plane axis is also called 'proximo-distal' axis in this text, and corresponding directions are sometimes called "z-directions" or "axial directions"). To this end, the undercuts may be undercuts with respect to the out-of-plane direction, which, relative to the longitudinal direction along which the profile body extends, is a transversal direction. Therefore, the profile body that extends in a longitudinal direction will be undercut with respect to at least one transversal direction.

For embedding the profile body, at least the first object includes thermoplastic material that is capable of being made flowable by absorption of the mechanical energy while the objects are pressed against each other. The mechanical vibration energy is coupled through the first and/or second object to the interface with the profile body and may be further coupled through the profile body to the interface with the second/first object, respectively. At the corresponding interface, external and possibly also internal friction will cause thermoplastic material to heat and become flowable, whereupon the profile body due to the pressure applied will be pressed into the material and become embedded thereby. The structure of the profile body having a profile in this may serve as energy director, i.e. the energy absorption and heat generation will automatically be focussed on the respective interface.

The step of pressing may be carried out until the abutting surface portions of the first and second objects lie against each other, with the profile body embedded in the material of the first object and of the second object.

In a group of embodiments, also the second object will include a thermoplastic material. Then, in embodiments, the objects are initially positioned relative to one another with the profile body lying between them as an initially separate object. The embedding in the second object may then be caused in the same step as the embedding in the first object, i.e. by applying the mechanical vibration and the pressing force.

Therefore, in embodiments of this group, the method of bonding a first object to a second object, wherein the first and second objects each include thermoplastic material in a solid state and each have a surface portion, includes:

- providing the first and second objects and further providing a profile body extending along a longitudinal direction and having a shape that defines a first and a second undercut,
- arranging the profile body relative to the first and second objects between the surface portions of the first and second objects,
- coupling a pressing force and mechanical vibration energy into at least one of the first and second objects, wherein the pressing force causes the profile body to be clamped between the first and second objects, until a flow portion of thermoplastic material of the first and second objects becomes flowable, until the profile body is embedded in the second object along the second object surface portion so that the second undercut is within thermoplastic material of the second object, and the profile body is embedded in the first object along the first object surface portion so that the first undercut is within thermoplastic material of the first object, and letting the thermoplastic material re-solidify.

For example (this is an option for all embodiments), the step of coupling the pressing force and the mechanical vibration into the first/second object may be done by a sonotrode that is pressed against the respective object while the other object may be held directly or indirectly by a support (that may support held directly against the second object at the lateral position at which the sonotrode acts, or that may be constituted by a framework of a more complex object that holds the second object; such complex framework may for example by a body of an item to be assembled, such as a car body). Optionally, a protection pad may be placed between the sonotrode and the respective object, for example to avoid that the sonotrode causes an impression on the respective object.

In a sub-group of this group of embodiments, the method is carried out so that the first and second undercuts are essentially simultaneously embedded in the thermoplastic materials of both objects, i.e. by the effect of the energy thermoplastic material portions of both objects start becoming flowable at a same stage. To this end, the material composition of the first and second objects and/or the shapes of the anchoring portions of the profile body, which anchoring portions include the respective undercut, may be slightly different to compensate for the fact that without such measures the energy absorption could be higher at the interface between the profile body and that one of the objects into which the mechanical vibration energy is coupled.

In another sub-group of embodiments, the method is carried out so that the anchoring portions, which include the respective undercuts, are embedded sequentially, one after the other.

In a group of embodiments, the profile body is provided to have a stabilizer portion, which may be an essentially flat portion extending, during the process, between the first and second surface portions and for example parallel thereto. From the stabilizer portion, first and second anchoring portions including the undercuts project into the directions of the first and second object, respectively.

Thus, in embodiments of this group, the profile body includes an essentially flat stabilizer portion, at least one first anchoring portion forming the first undercut projecting from the stabilizer portion into a proximal direction, and at least one second anchoring portion forming the second undercut projecting from the stabilizer portion into a distal direction.

For example, the profile body may include at least two first anchoring portions and/or may include at least two second anchoring portions. A distance between two neighbouring ones of the anchoring portions projecting to one side may be chosen to be such that in the step of embedding the respective anchoring portion, thermoplastic material portions of the respective first/second object remain solid between the anchoring portions. In addition or as an alternative, a stabilizer portion may laterally extend further than a location from which the anchoring portion or anchoring portions project, for example so that thermoplastic material portions of the respective first/second object that come into contact with the laterally extending portion of the stabilizer portion remain solid.

Profile bodies that have a stabilizer portion are especially suited for the approach in which the anchoring portions are not necessarily embedded simultaneously but are embedded sequentially, or where the course of embedding processes is not exactly known or varies and depends on other parameters. This is because the stabilizer portion serves as a stop for the relative movement of the profile body into the material of the respective object and thereby defines where the interface is. Therefore, the stabilizer portion will always cause the profile body to be sufficiently embedded in both objects, even if the embedding in one of the objects encounters much less resistance than the embedding in the other one of the objects.

Especially, in the step of embedding the profile body within the thermoplastic material of the first and second objects, the pressing force may be caused to act until the stabilizer portion is clamped between the first and second object surface portions.

In embodiments in which the profile body extends in a one-dimensional manner, the profile body may be placed relative to the first and second objects in a manner that it forms a closed path in the sense that at least the flow portion of at least one of the objects goes around the closed path without interruption so that a closed seal is formed, whereby the entry of moisture or other substance in a region between the first and second objects may be prevented.

Generally, in embodiments, the shape (extension of the profile body in axial direction) can be quite small, depending on the material. A bonding path can, for example, be between 0.5 mm and 3 mm on each side, for example about 1 mm on each side. In this, the bonding path is the movement done vertically (essentially perpendicularly to the surface portions) of the sonotrode that couples the mechanical vibration into the first or second object while the sonotrode exerts the pressing force.

In a further sub-group of embodiments in which both, the first and second objects include thermoplastic material, the method include embedding the profile body in the material of the second object prior to positioning the first object relative to the second object. For this, for example the mechanical energy, especially vibration energy, may be caused to impinge directly on the profile body for embedding the profile body in the second object. This is carried out in a manner that the portion of the profile body that has the first undercut after the step protrudes from the second object, i.e. is not embedded in the second object. Thereafter, after the thermoplastic material of the second object has re-solidified, the first object is brought into contact with the profile body and pressed towards the second object while mechanical vibration energy impinges, for example on the first object.

In embodiments in which both, the first and the second object include thermoplastic material, the method may include causing a weld between the first and second objects. Especially, the mechanical energy that impinges on the first/second object may be sufficient to make thermoplastic material portions flowable also at the interface between the first and second object, for example next to the profile body or, if the profile body extends two-dimensionally, in through openings thereof. For the weld, the first and/or second object may include an energy directing structure that comes into contact with the other one of the objects when the objects are pressed against each other to embed the profile body.

The invention also concerns a profile body for carrying out the invention. Especially, the profile body may include a stabilizer portion of the above-discussed kind, of which hereinafter principles and embodiments are described in more detail. Such stabilizer portion is a flat, for example strip-like portion of the profile body, from which portion to both sides each at least one anchoring portion projects, wherein the anchoring portion(s) on their own or together form the respective first/second undercut.

Applications of the approaches according to the invention are example in the automotive or aviation industry or other industries focussing on lightweight materials. In embodiments having a first object to a second object, the second object may for example be a part of an automobile body and wherein the first object may be a specific automobile part to be bonded to the automobile body.

The liquefaction of the flow portion may be primarily caused by friction between the vibrating object and the surface of the respective other object, which friction heats the object that has the thermoplastic material superficially.

In this text the expression "thermoplastic material being capable of being made flowable e.g. by mechanical vibration" or in short "liquefiable thermoplastic material" or "liquefiable material" or "thermoplastic" is used for describing a material including at least one thermoplastic component, which material becomes liquid (flowable) when heated, in particular when heated through friction i.e. when arranged at one of a pair of surfaces (contact faces) being in contact with each other and vibrationally moved relative to each other, wherein the frequency of the vibration has the properties discussed hereinbefore. In some situations, for example if the first object itself has to carry substantial loads, it may be advantageous if the material has an elasticity coefficient of more than 0.5 GPa. In other embodiments, the elasticity coefficient may be below this value, as the vibration conducting properties of the first object thermoplastic material do not play a role in the process. Especially, since the profile body may have a relatively small extension in the proximodistal direction and since therefore the method is also suitable for fixing a relatively thin first or second object to the second or first object (including the possibility of both objects being thin), the approach of the invention may also work for thermoplastic materials that are poor vibration conductors, such as thermoplastic materials with a low modulus of elasticity and/or with elastomeric properties. This is especially the case since the shape of the profile body may ensure that the contact with the respective object is essentially line-shaped. This has a high energy concentrating effect, making a local liquefaction possible even if the thermoplastic material has strong damping properties.

Thermoplastic materials are well-known in the automotive and aviation industry. For the purpose of the method according to the present invention, especially thermoplastic materials known for applications in these industries may be used.

A thermoplastic material suitable for the method according to the invention is solid at room temperature (or at a temperature at which the method is carried out). It preferably includes a polymeric phase (especially C, P, S or Si chain based) that transforms from solid into liquid or flowable above a critical temperature range, for example by melting, and re-transforms into a solid material when again cooled below the critical temperature range, for example by crystallization, whereby the viscosity of the solid phase is several orders of magnitude (at least three orders of magnitude) higher than of the liquid phase. The thermoplastic material will generally include a polymeric component that is not cross-linked covalently or cross-linked in a manner that the cross-linking bonds open reversibly upon heating to or above a melting temperature range. The polymer material may further include a filler, e.g. fibres or particles of material which has no thermoplastic properties or has thermoplastic properties including a melting temperature range which is considerably higher than the melting temperature range of the basic polymer.

In this text, generally a "non-liquefiable" material is a material that does not liquefy at temperatures reached during the process, thus especially at temperatures at which the thermoplastic material of the first object is liquefied. This does not exclude the possibility that the non-liquefiable material would be capable of liquefying at temperatures that are not reached during the process, generally far (for example by at least 80° C.) above a liquefaction temperature of the thermoplastic material or thermoplastic materials liquefied during the process. The liquefaction temperature is the melting temperature for crystalline polymers. For amorphous thermoplastics the liquefaction temperature (also called "melting temperature in this text") is a temperature above the glass transition temperature at which the becomes sufficiently flowable, sometimes referred to as the 'flow temperature' (sometimes defined as the lowest temperature at which extrusion is possible), for example the temperature at which the viscosity drops to below $10^4$ Pa*s (in embodiments, especially with polymers substantially without fiber reinforcement, to below $10^3$ Pa*s)), of the thermoplastic material.

For example, non-liquefiable material may be a metal, such as aluminium or steel, or a hard plastic, for example a reinforced or not reinforced thermosetting polymer or a reinforced or not reinforced thermoplastic with a melting temperature (and/or glass transition temperature) considerably higher than the melting temperature/glass transition temperature of the liquefiable part, for example with a melting temperature and/or glass transition temperature higher by at least 50° C. or 80° C.

Specific embodiments of thermoplastic materials are: Polyetherketone (PEEK), polyesters, such as polybutylene terephthalate (PBT) or Polyethylenterephthalat (PET), Polyetherimide, a polyamide, for example Polyamide 12, Polyamide 11, Polyamide 6, or Polyamide 66, Polymethylmethacrylate (PMMA), Polyoxymethylene, or polycarbonateurethane, a polycarbonate or a polyester carbonate, or also an acrylonitrile butadiene styrene (ABS), an Acrylester-Styrol-Acrylnitril (ASA), Styrene-acrylonitrile, polyvinyl chloride (PVC), polyethylene, polypropylene, and polystyrene, or copolymers or mixtures of these.

In embodiments in which both, the first and the second object include thermoplastic material and no welding is desired, the material pairing is chosen such that the melting temperature of the second object material is substantially higher than the melting temperature of the first object material, for example higher by at least 50°. Suitable material pairings are for example polycarbonate or PBT for the first object and PEEK for the second object.

In addition to the thermoplastic polymer, the thermoplastic material may also include a suitable filler, for example reinforcing fibers, such as glass and/or carbon fibers. The fibers may be short fibers. Long fibers or continuous fibers may be used especially for portions of the first and/or of the second object that are not liquefied during the process.

The fiber material (if any) may be any material known for fiber reinforcement, especially carbon, glass, Kevlar, ceramic, e.g. mullite, silicon carbide or silicon nitride, high-strength polyethylene (Dyneema), etc.

Other fillers, not having the shapes of fibers, are also possible, for example powder particles.

Mechanical vibration or oscillation suitable for the method according to the invention has preferably a frequency between 2 and 200 kHz (even more preferably ultrasonic vibration having a frequency between 10 and 100 kHz, or between 20 and 40 kHz) and a vibration energy of 0.2 to 20 W per square millimeter of active surface. The vibrating tool (sonotrode) is e.g. designed such that its contact face oscillates predominantly in the direction of the tool axis (longitudinal vibration) and with an amplitude of between 1 and 100 µm, preferably around 30 to 60 µm. Such preferred vibrations are e.g. produced by ultrasonic devices as e.g. known from ultrasonic welding.

In this text, the terms "proximal" and "distal" are used to refer to directions and locations, namely "proximal" is the side of the bond from which an operator or machine applies the mechanical vibrations, whereas distal is the opposite side. A broadening of the connector on the proximal side in this text is called "head portion", whereas a broadening at the distal side is the "foot portion".

BRIEF DESCRIPTION OF THE DRAWINGS

Hereinafter, embodiments of the aspects of the invention are described referring to drawings. The drawings are all schematical and not to scale. In the drawings, same reference numbers refer to same or analogous elements. The drawings are used to explain the invention and embodiments thereof and are not meant to restrict the scope of the invention. Terms designating the orientation like "proximal", "distal", etc. are used in the same way for all aspects and drawings.

The drawings show.

DETAILED DESCRIPTION OF THE INVENTION

Figure 1:
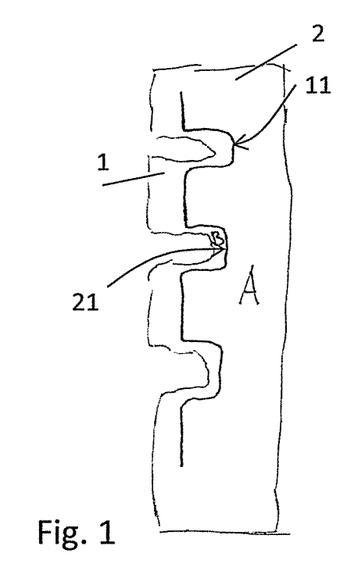
FIG. 1 is a first object and a second object with a complex border shape.

FIG. 1 very schematically illustrates that the second object 2 and the first object 1 may have a complex border shape. The present invention according is independent of a particular shape. More in particular, the first object 1 is shown with a first object surface portion 11 resting against a second object surface portion 21 of the second object, wherein the first and second objects in the depicted embodiment have shapes adapted to each other. In other embodiments, the first and second object surface portions follow shapes that are not entirely matched to each other, whereby the objects may be in physical contact with each other only locally.

Figure 2:
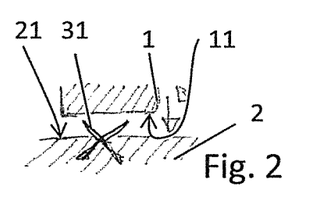
FIG. 2 is an arrangement in which the profile body is provided embedded in the second object.

FIG. 2 shows a first possibility with the profile body 31 being a profiled metal wire. In the depicted embodiment, the profile body has a cross shaped cross section. The profile body 31 is initially embedded in the second object 2 so that the second undercut portion (in the depicted configuration formed by the lower half of the profile body) is immersed in the second object 2. In this, the second object may be of any suitable material, including a thermoplastic or a thermosetting polymer, both with or without reinforcement, or also a metal. The material of the second object in which the profile body is embedded may be, but does not need to be, liquefiable.

The first object 1 is pressed against the second object while mechanical vibration energy is coupled into the first object and/or the second object. This is continued until in a region around the profile body 31 enough thermoplastic material of the first object 1 is made flowable for those parts of the profile body that are not within the second object to be immersed in the second object and the surfaces of the first and second objects lying against each other.

Figure 3:
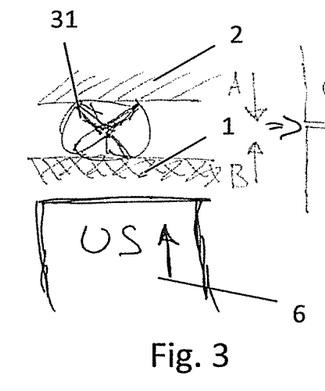
FIG. 3 is an arrangement in which the profile body is initially separate from both objects.

FIG. 3 shows the second possibility in which both, the first and second objects 1, 2 both include thermoplastic material and the profile body 31 is initially separate. FIG. 3 illustrates the mechanical vibration acting from the side of the first object 1 (sonotrode 6). However, it would also be possible to couple the vibration in from the second object side or from both sides.

The application of the mechanical vibration causes materials of the first and second objects to flow around the profile body (metal wire) length to create a continuous positive-fit connection along a whole length of the profile body. Thereby, a connection following a linear profile—defined by how the profile body is placed—may result. The connection may be watertight and replace a gluing connection.

Figure 4:
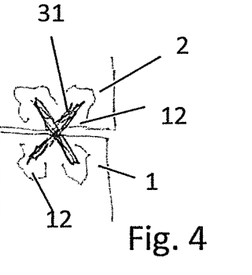
FIG. 4 is an arrangement of the kind shown in FIG. 2 or FIG. 3 after the process.
Figure 5:
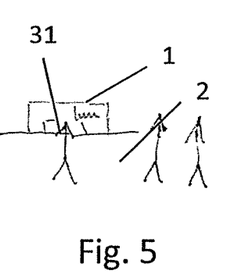
FIGS. 5-8 are alternative cross sections of profile bodies.

FIG. 4 shows the resulting situation with the flow portion 12 re-solidified. The flow portion 12 is illustrated on both sides, i.e. in the first and in the second object, as is the case if the initial configuration is the one of FIG. 3. For an initial configuration as depicted in FIG. 2, there is not necessarily a flow portion within the second object (but this is not excluded either, depending on the second object material).

Especially in case the materials of the first and second objects are not the same, the cross section of the profile body may be tuned to suit the different properties of these materials. For example, the cross section and an edge profile thereof may be optimized for insertion with the help of the mechanical vibration to the specific melting characteristics of the materials.

FIGS. 5-8 illustrate according alternative profiles. For example, the profile shown in FIG. 5 may be especially suited if the first object 1 material is comparably hard and/or becomes flowable only at a somewhat more elevated temperature than the material of the second object. To this end, the one portion of the profile body (upper edge in FIG. 5) that faces the first object has a more cutting characteristic, whereas the portion that faces the second object is less cutting, in FIG. 5 by having two spaced-apart edges that are at an angle to the axial direction.

Figure 6:
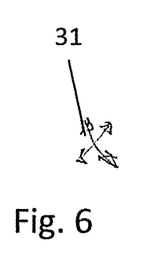
Figure 7:
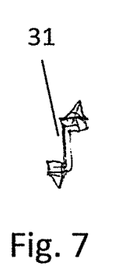
Figure 8:
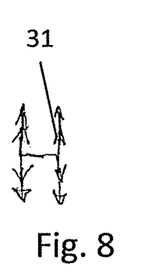

The variants of FIGS. 6-8 include barb-like structures that contribute to the undercut.

Figure 9:
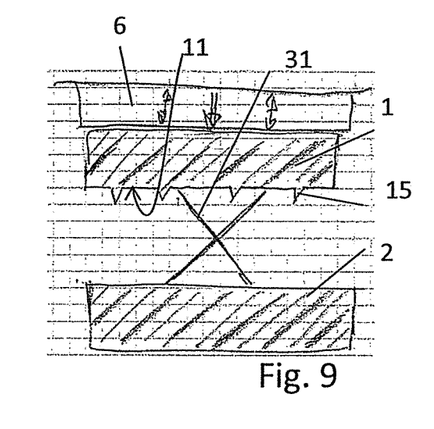
FIG. 9 is an arrangement like the one of FIG. 3 but with additional measures for achieving a weld.

FIG. 9 depicts an embodiment in which in addition to connection by the profile body—which is shaped similarly to FIG. 3—also a weld between the first and second objects is achieved. To this end, the first object surface portion 11 is provided with a plurality of energy directors, such as energy directing ridges running perpendicular to the drawing plane. After the flow portion has become flowable and the first and second object surface portions get into physical contact, the mechanical vibration energy and pressing force will cause thermoplastic material to become flowable also at the interface between the first and second objects and thereby cause a weld.

The option of causing a weld is applicable for all embodiments of the present invention as far as they involve materials of the first and second objects that are capable of welding to each other.

Profile bodies 31 that are embedded in material of the two objects that are welded to each other also serve as reinforcement objects according to the second aspect described in somewhat more detail hereinafter.

Figure 10:
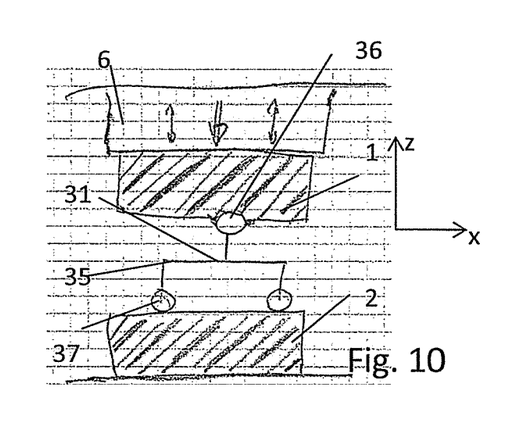
FIG. 10 is an arrangement with a profile body including a stabilizer portion.

FIG. 10 shows an embodiment in which the profile body 31 has the following further features:

The profile body 31 has a stabilizer portion 35 that extends approximately parallel to the first and second object surface portions (perpendicular to the axial (z-) direction in the embodiment of FIG. 10). A plurality of anchoring portions 36, 37 extend from the stabilizer portion 35.

The number and/or shape of the first anchoring portion(s) 36 that extend(s) towards the first object 1 and that is/are to be embedded in the first object 1 is/are different from the number and/or shape of the second anchoring portion(s) 37 that extend(s) towards the second object 2 and that is/are to be embedded in the second object 2.

The first anchoring portion(s) 36 and the second anchoring portion(s) 37 are offset with respect to each other, i.e. are arranged at different in-plane (x-y-) positions.

A distance d between two neighbouring ones of the second anchoring portions 37 is greater than a width of the flow portion, as explained in more detail hereinafter.

These features are independent of each other and may be realized alone or in arbitrary combinations or sub-combinations.

More in particular, the embodiments of the invention involve coupling the mechanical vibration energy and the relative pressing force into the first object or the second object only (or, in special embodiments, also into the first object and the second object) but not directly into the profile body. By this, neither the movement of the profile body relative to the first/second objects nor its position can be directly controlled, at least not in situations where initially the profile body is separate from both, the first and second objects (as in FIG. 3), i.e. is not firmly connected to any one of these.

Nevertheless, in embodiments it is possible to indirectly control this movement.

For example, in a group of embodiments, the profile body may be caused to be embedded in the second or first object first and only when it has penetrated to the desired level in this second/first object then material of the other one of the objects may be caused to become flowable in sufficient amount for the profile body to penetrate therein, too.

A stabilizer portion 35 of the kind shown in FIG. 10 may be used to define the penetration depth and the position and orientation of the profile body relative to the first/second objects. To this end, the stabilizer portion extends over a substantial area parallel to the plane defined by the surface portions and substantially inhibits for example even prevents a material flow across this area over which it extends. Especially, the stabilizer portion may be sheet-like.

Figure 11:
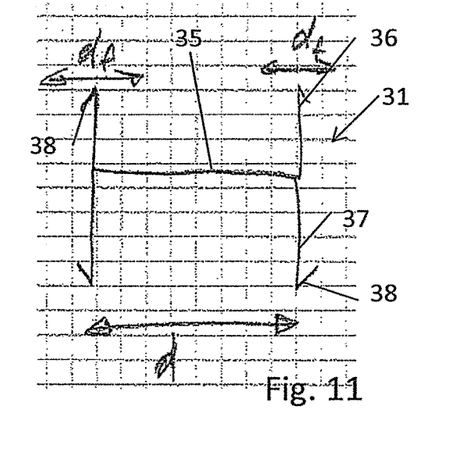
FIGS. 11-19 are alternative profile bodies.

An additional optional feature that may assist the stabilizing effect of the stabilizer portion is illustrated referring to FIG. 11. Namely, the extension d of the stabilizer portion along the plane is large enough for the flow portions caused by the anchoring portions do not, during any stage of the process, extend across the full extension of the stabilizer portion. FIG. 11 shows an average diameter $d_f$ of the flow portions caused by the first anchoring portions 36 in relation to the extension d of the stabilizer portion.

By the fact that between the anchoring portions 37 there is a portion of material of the first object (and/or second object) that remains solid during the process, the axial (z-) position of the stabilizer portion with respect to the first and second objects as well as its orientation are exactly defined by the respective surface portions. This also defines the penetration depth of the anchoring portions 36, 37.

Also, in embodiments with an asymmetry in which first the anchoring portion(s) of the first object are embedded and only then the anchoring portion(s) of the second object—or vice versa—the anchoring portion stabilizer portion 35 serves as stop for the first face and thereafter may assist the energy transfer through the assembly.

Also smaller stabilizer portion that does not necessarily meet the condition that the extension d of the stabilizer portion along the plane is large enough for first object material to remain solid between the anchoring portions (as for example in FIG. 8, where the profile body has a double-T-bar cross section with barbed edges) does have a stabilizing effect because it serves to stop and confine material flow.

Independently of the stabilizer portion 35 and its dimension, the embodiment of FIG. 11 has optional barb features 38 causing the undercuts and being caused by folded outermost portions of the anchoring portions. In addition or as an alternative to this, the undercut could be caused by the anchoring portions 36, 37 projecting into a direction that is not parallel to the axial direction, as for example shown in FIG. 12.

The following parameters may have an influence on where the respective thermoplastic material starts becoming flowable if both, the first and the second object include thermoplastic material at least at the surface portions in contact with the profile body 31:

The material composition. For example, the first object thermoplastic material may be different from the second object material and have a higher or lower liquefaction temperature (=temperature at which the material becomes sufficiently flowable, corresponding to the melting temperature if a melting temperature is defined, or corresponding to the 'flow temperature' (sometimes defined as the lowest temperature at which extrusion is possible), a temperature above the glass transition temperature at which the material becomes sufficiently flowable, for example the temperature at which the viscosity drops to below $10^4$ Pa*s (in embodiments, especially with polymers substantially without fiber reinforcement, to below $10^3$ Pa*s)). The anchoring portion(s) on the side at which the liquefaction temperature is lower tend(s) to become embedded first.

Figure 13:
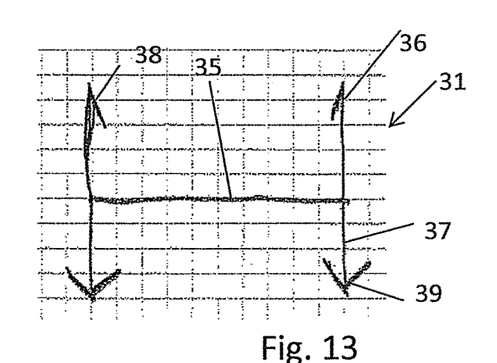

The energy directing properties of the respective portions of the profile body that come into contact with the respective object first: For example FIG. 13 illustrates a profile body 31 where the first anchoring portions 36 have a first barb feature 38 that defines a rather pronounced edge, whereas the second anchoring portions 37 have a second barb feature 39 with a less pronounced edge, whereby the first barb feature tends to cause onset of liquefaction first.

Figure 12:
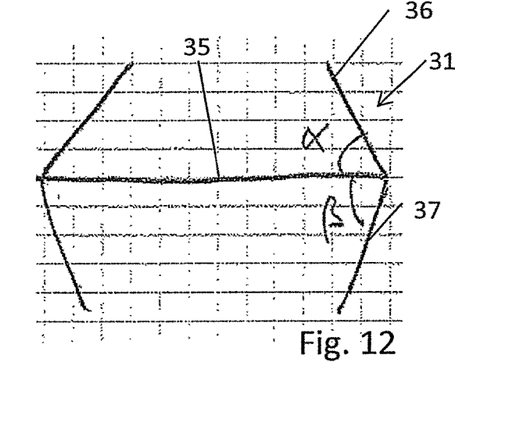

Similarly, if the anchoring portions include a sheet portion, the angle of the sheet portion with respect to the axis. In FIG. 12, the angle α of the first anchoring portions 36 to the stabilizer portion 35 is smaller than the angle β of the second anchoring portions 37, whereby the second anchoring portions tend to cause onset of liquefaction first.

The side from which the vibrations are coupled into the assembly. Liquefaction tends to set in on the proximal side, i.e. the side from which the vibrations are coupled into the system, first.

Especially if the profile body does not have a stabilizer portion, such as in the embodiment of FIG. 3, these parameters may be used to level the differences out to ensure that the profile body is embedded in the two objects to a similar extent. For example, if the vibrations are coupled into the system from one side, one of the other mentioned parameters (material properties, energy directing properties, angle) may be used to compensate the thus arising asymmetry. Also if the material needs to be different because this is demanded by an application, the other parameters may be used to compensate.

However, especially if the profile body has a stabilizer portion, an asymmetry of the liquefaction properties may be desired, and the parameters may be used to ensure a controlled liquefaction and embedding process.

Figure 14:
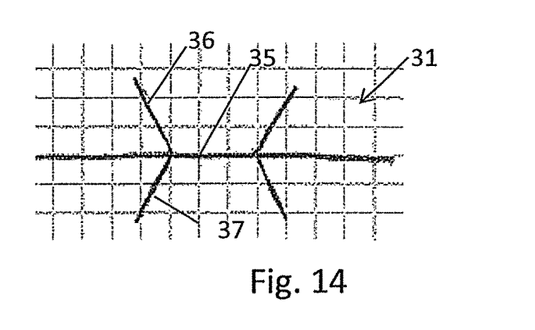

FIG. 14 depicts a profile body 31 with a stabilizer portion 35 that laterally extends further than the locations from which the anchoring portions 36, 37 project. A profile body of this kind has a stabilizing effect also if the neighbouring anchoring portions are close together, and even if they project from a same location (which would for example be the case if the profile body of FIGS. 2, 3, and 9 was provided with an additional stabilizer portion extending between the first and second objects, for example essentially parallel to their respective surfaces).

In the embodiment shown in FIG. 14, the lateral extension of the stabilizer portion is sufficient so that thermoplastic material portions of the respective first/second object that come into contact with the laterally extending portions (laterally of the anchoring portion) of the stabilizer portion remain solid.

Figure 15:
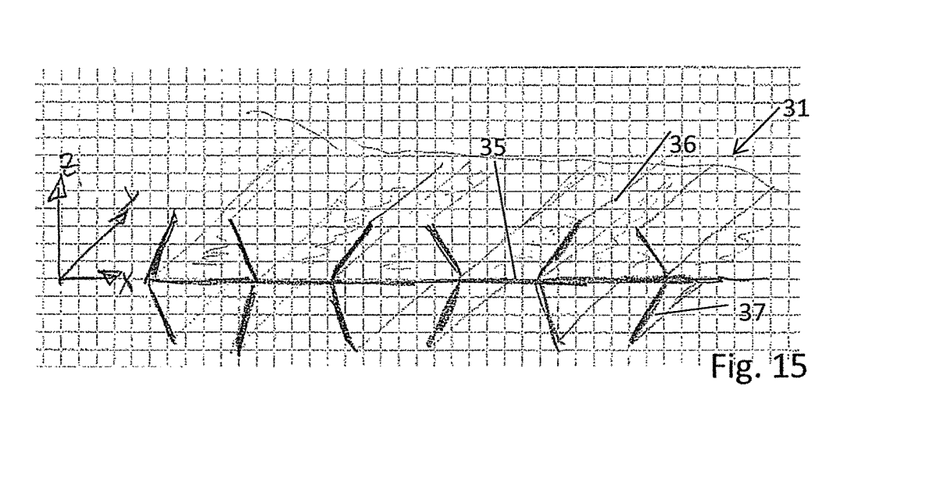

FIG. 15 shows an embodiment in which the profile body 31 in contrast to the previously discussed embodiments does not only substantially extend in one in-plane dimension, like a wire, but has a substantial extension in two in-plane dimensions. In the example of FIG. 14, the x-z-cross section remains constant along the y direction, i.e. the profile body has a symmetry along the y axis.

Two-dimensional profile bodies may be used to achieve a two-dimensional bond.

Figure 16:
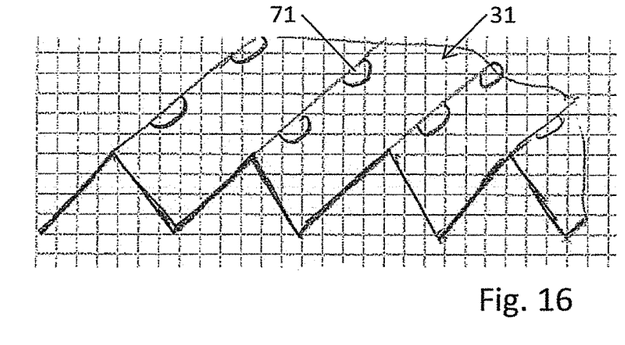

Because in contrast to one-dimensional, wire-like profile bodies, it is more difficult to bend a two-dimensional profile body in the plane, the bond by the profile body of FIG. 15 will tend to be less strong with respect to shearing forces along the y-direction (longitudinal direction) between the objects. FIG. 16 shows an embodiment of a profile body 31 that is made of a folded metal sheet with a pattern of through holes 71 along the proximal and distal (upper and lower) edges. The portions around the holes 71 form the respective undercuts in that the material in contact with the respective edges when liquefied flows through the holes and into the space underneath the holes. This embodiment deals with the above-mentioned possible disadvantage in that it also locks the first and second objects to each other with respect to relative movements in y-direction.

Figure 17:
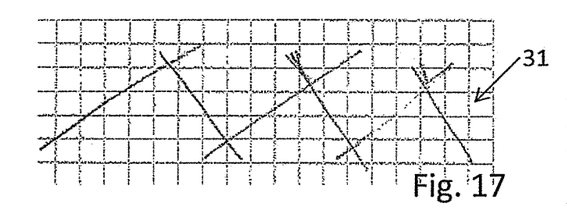

FIG. 17 shows a section through a further embodiment of a profile body 31 (that extends into the y-direction perpendicular to the drawing plane). Given a sufficient lateral (x-direction) extension, the profile body 31 of the kind shown in FIG. 17 may completely separate the material of the first and second objects from each other, i.e. the first object material flows into the undercut structures on one side of the profile body, and the second object material flows in to the undercut structures on the other side only.

Figure 18:
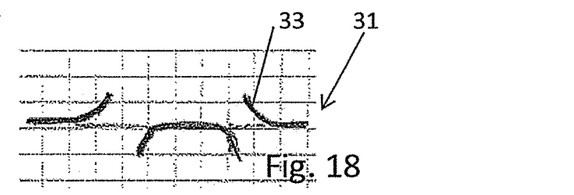
Figure 19:
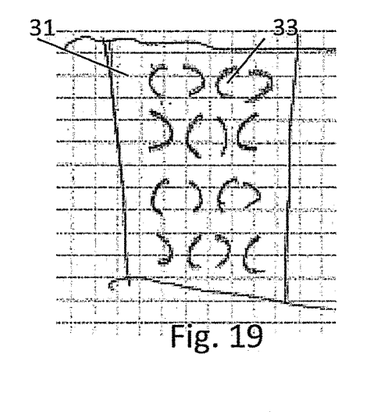

The profile body 31 shown in section in FIG. 18 and in top view in FIG. 19 includes a strip of a sheet material with a plurality of tongues 33 cut out of the sheet material and bent towards the proximal or distal side, respectively. In the depicted embodiment, the tongues and the direction towards which they are bent form a regular pattern. Instead of forming a strip, the profile body 31 could also be endless (i.e. capable of being cut in any shape) in both lateral dimensions.

Figure 20:
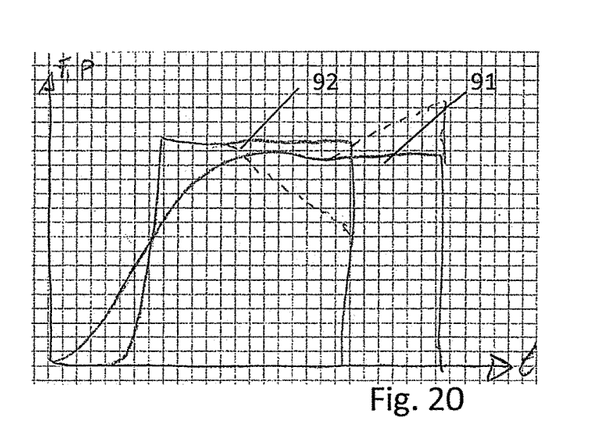
FIG. 20 is a process diagram.

FIG. 20 illustrates a process diagram. The figure shows the pressing force 91 and the vibration power 92 as a function of time. The pressing force 91 may be maintained for some time after the vibrations are switched off (post-pressing phase). Optionally, during this phase the pressing force may even be raised (dashed line). Also, it is an option to follow a certain vibration power profile, for example including slowly reducing the vibration power towards the end of the liquefaction process (dashed line).

Figure 21:
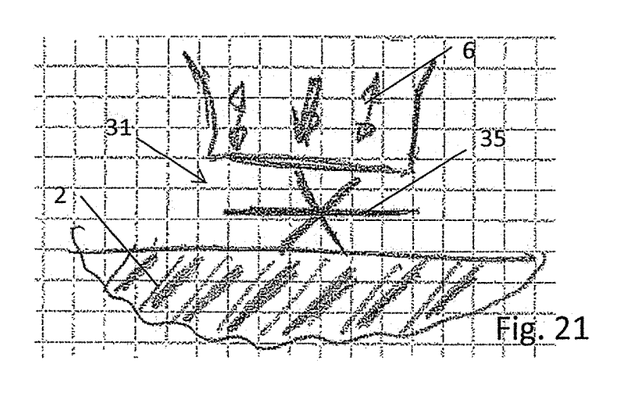
FIG. 21 is an arrangement for embedding a profile body in the second object.

FIG. 21 yet illustrates the process of embedding the profile body 31 in thermoplastic material of the second object 2 for embodiments in which the first object 1 is positioned only after the profile body has been embedded in the second object, possibly after the flow portion of the second object thermoplastic material has re-solidified. In FIG. 21, the profile body 31 is illustrated to include a stabilizer portion 35 that during the step of embedding the profile body in the second object serves as a stop and that also during the subsequent step of embedding in the first object (compare FIG. 2) ensures that the first undercut is embedded in the first object, i.e. that the profile body is not driven further into the second object.

In addition or as an alternative to the profile body including the stabilizer portion 35 also other measures could be taken to ensure this. For example, if the first and second objects have different thermoplastic materials, the second object may be chosen to be the object that has the thermoplastic material with the higher liquefaction temperature. In addition or alternatively, the measures discussed referring to FIGS. 12 and 13 and/or the placement of the sonotrode relative to the arrangement may be sued as such measure.

What is claimed is:

1. A method of bonding a first object to a second object wherein the first and second objects each have a surface portion, the method comprising:
   providing the first and second objects and further a providing a profile body extending along a longitudinal direction and having a shape that defines a first and a second undercut,
   embedding the profile body in the second object along the second object surface portion so that the second undercut is within material of the second object, and
   embedding the profile body in the first object along the first object surface portion so that the first undercut is within thermoplastic material of the first object,
   wherein at least embedding of the profile body in the first object is caused by mechanical energy impinging on the first object and/or on the second object while the first object and the second object are pressed against each other, and
   wherein at least one of the following conditions is met:
      embedding the profile body in the second object is carried out prior to embedding the profile body in the first object so that during the step of embedding the profile body in the first object, the profile body is embedded in the second object;
      the profile body comprises a stabilizer portion and at least one first anchoring portion forming the first undercut projecting from the stabilizer portion into a first direction, and at least one second anchoring portion forming the second undercut projecting from the stabilizer portion into a second direction, wherein the step of embedding the profile body in the first object and/or the second object comprises causing the stabilizer portion to extend between the first and second object surface portions.

2. The method according to claim 1, wherein the step of embedding the profile body in the first object is carried out until the first object surface portion and the second object surface portion lie against each other.

3. The method according to claim 1, wherein the second object along the second object surface portion has thermoplastic material, and wherein embedding the profile body in the second object along the second object surface portion comprises embedding the profile body in this second object thermoplastic material.

4. The method according to claim 3, wherein the step of embedding the profile body in the second object is carried out simultaneously with the step of embedding the profile body in the first object, and caused by the mechanical energy.

5. The method according to claim 3, wherein for being embedded in the first and second object the profile body is arranged relative to the first and second objects between the surface portions of the first and second objects, and wherein the step of embedding the profile body in the first object and the step of embedding the profile body in the second object comprise coupling a pressing force and mechanical vibration energy into at least one of the first and second objects, wherein the pressing force causes the profile body to be clamped between the first and second objects.

6. The method according to claim 1, wherein causing mechanical energy to impinge on the first object and/or on the second object and causing the first and second objects to be pressed against each other comprise using a vibrating sonotrode to press the first and second objects against each other.

7. The method according to claim 1, wherein the stabilizer portion is essentially flat, and wherein the step of pressing and causing energy to impinge is carried out until both, the first object surface portion and the second object surface portion abut against the stabilizer portion.

8. The method according to claim 1, wherein the profile body comprises at least two first anchoring portions and/or at least two second anchoring portions.

9. The method according to claim 8, wherein in the step of embedding the profile body in the first object and/or the second object, a material portion of the first object or the second object, respectively between two neighbouring anchoring portions remains solid.

10. The method according to claim 1, wherein the second object along the second object surface portion has thermoplastic material, and wherein the steps of embedding the first anchoring portion in the first object and of embedding the second anchoring portion in the second object are carried out sequentially, one after the other.

11. The method according to claim 1, and comprising causing a weld between thermoplastic portions of the first and second objects at the surface portions.

12. The method according to claim 11, wherein the weld is caused by the mechanical energy.

13. The method according to claim 1, wherein the profile body is a profiled wire or profiled rod.

14. The method according to claim 13, wherein the profile body has a constant cross section along its length.

15. The method according to claim 13, wherein the profile body extends along a closed path.

16. The method according to claim 1, wherein the profile body is a two-dimensional object extending along two in-plane dimensions.

17. The method according to claim 16, wherein the profile body comprises a folded metal sheet with a plurality of through openings.

18. The method according to claim 1, wherein the profile body is metallic.

19. The method according to claim 1, wherein the profile body is bendable.

20. A profile body for use in a method according to claim 1, the profile body comprising an essentially flat stabilizer portion extending along a plane, at least one first anchoring portion projecting from the plane towards one side of the plane and at least one second anchoring portion extending from the plane towards the opposite side of the plane, wherein the at least one first anchoring portion forms a first undercut with respect to directions perpendicular to the plane, and the at least one second anchoring portion forms a second undercut with respect to directions perpendicular to the plane.

21. The profile body according to claim 20, extending continuously along a longitudinal direction parallel to the plane.

22. The profile body according to claim 21, wherein a cross section perpendicular to the one direction is constant with respect to translations along the longitudinal direction.

23. The profile body according to claim 21, wherein a transversal extension of the profile body parallel to the plane and perpendicular to the longitudinal direction is at most 2 mm.

24. The profile body according to claim 20, comprising at least two first anchoring portions and/or at least two second anchoring portions.

25. The profile body according to claim 24, wherein the first or second anchoring portions, respectively, project from different attachment locations at which they are connected to the stabilizer portion.

26. The profile body according to claim 24, wherein at least one of the first or second anchoring portions, respectively, projects into a direction different from perpendicular to the plane.

27. The profile body according to claim 20, wherein at least one of the anchoring portions has a barb feature.

28. The profile body according to claim 20, wherein the stabilizer portion laterally extends further than locations from which the anchoring portions project.

* * * * *